US011261093B2

(12) United States Patent
Corbel et al.

(10) Patent No.: US 11,261,093 B2
(45) Date of Patent: Mar. 1, 2022

(54) METHOD FOR NITROGEN DOPING OF SOLID MATERIALS

(71) Applicants: Centre National de la Recherche Scientifique, Paris (FR); École Polytechnique, Palaiseau (FR); Commissariat à l'Énergie Atomique et aux Énergies Alternatives, Paris (FR)

(72) Inventors: Catherine Corbel, Le Plessis-Robinson (FR); Irina Shchedrina, Palaiseau (FR); Jean-Philippe Renault, Massy (FR)

(73) Assignees: CENTRE NATIONAL DE LA RECHERCHE SCIENTIFIQUE, Paris (FR); ÉCOLE POLYTECHNIQUE, Palaiseau (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 53 days.

(21) Appl. No.: 16/333,715

(22) PCT Filed: Sep. 15, 2017

(86) PCT No.: PCT/FR2017/052474
§ 371 (c)(1),
(2) Date: Mar. 15, 2019

(87) PCT Pub. No.: WO2018/051037
PCT Pub. Date: Mar. 22, 2018

(65) Prior Publication Data
US 2019/0270643 A1 Sep. 5, 2019

(30) Foreign Application Priority Data
Sep. 15, 2016 (FR) ...................................... 1658615

(51) Int. Cl.
| | | |
|---|---|---|
| C01B 31/04 | (2006.01) | |
| C01B 32/194 | (2017.01) | |
| C01B 32/156 | (2017.01) | |
| C01B 32/168 | (2017.01) | |
| C01B 32/21 | (2017.01) | |
| C01B 32/152 | (2017.01) | |
| C01B 32/20 | (2017.01) | |

(52) U.S. Cl.
CPC .......... *C01B 32/194* (2017.08); *C01B 32/152* (2017.08); *C01B 32/156* (2017.08); *C01B 32/168* (2017.08); *C01B 32/20* (2017.08); *C01B 32/21* (2017.08); *C01B 2202/22* (2013.01); *C01B 2204/22* (2013.01); *C01P 2002/54* (2013.01); *C01P 2006/20* (2013.01); *C01P 2006/40* (2013.01)

(58) Field of Classification Search
CPC ... C01B 32/156; C01B 32/168; C01B 32/194; C01B 32/21
See application file for complete search history.

(56) References Cited

PUBLICATIONS

Wang, L., et al., "A facile method to modify carbon nanotubes with nitro/amino group," Applied Surface Science 2010;256(20):6060-6064.
Yang, Y., et al., "Experimental and theoretical investigations of nitro-group doped porous carbon as a high performance lithium-ion battery anode," Journal of Materials Chemistry a Royal Society of Chemistry UK 2015;3(36):18657-18666.
Database WPI, Week 201620, Thomson Scientific, London, GB, An 2015-65562E, XP002769797, Sep. 9, 2015.
Li, L.-X., et al., "The effect of carbonyl, carboxyl and hydroxyl groups on the capacitance of carbon nanotubes," New Carbon Materials 2011;26(3):224-228.
Zhang, L., et al., "Simultaneous reduction and N-doping of graphene oxides by low-energy N2+ion sputtering," Carbon 2013;62:365-373.
Long, D., et al., "Preparation of Nitrogen-Doped Graphene Sheets by a Combined Chemical and Hydrothermal Reduction of Graphene Oxide," Langmuir 2010;26(20):16096-16102.
Lin, S. S., et al., "Surface characterization of ion beam modified graphite," Carbon 1993;31(3):509-517.
International Search Report and Written Opinion for PCT Patent App. No. PCT/FR2017/052474 (dated Aug. 10, 2018) with partial English translation.

*Primary Examiner* — Stuart L Hendrickson
(74) *Attorney, Agent, or Firm* — Kenealy Vaidya LLP

(57) ABSTRACT

A process for the nitrogen doping of a material includes a set of carbon atoms in the $sp^2$ hybridization state. The process further includes the material not being oxidized beforehand, then placing the material in contact with dinitrogen. Irradiating the material and the dinitrogen placed in contact with a beam of electrons or of light ions whose energy is greater than or equal to 0.1 MeV, to obtain a material wherein some of the carbon atoms in the $sp^2$ hybridization state is nitrogen-doped.

17 Claims, 4 Drawing Sheets

METHOD FOR NITROGEN DOPING OF SOLID MATERIALS

CROSS REFERENCE TO RELATED APPLICATIONS

This application is a national phase filing under 35 C.F.R. § 371 of and claims priority to International Patent Application No. PCT/FR2017/052474, filed on Sep. 15, 2017, which claims the priority benefit under 35 U.S.C. § 119 of French Application No. 1658615, filed on Sep. 15, 2016, the contents of which are hereby incorporated in their entireties by reference.

BACKGROUND

The presently disclosed subject matter relates to a process for the nitrogen doping of solid materials, these materials comprising or being constituted of a set of carbon atoms in $sp^2$ hybridization.

The discovery of graphene and of its exceptional properties, especially those of two-dimensional electron transport, gave rise to very active research on this material. One of these research routes is directed toward modifying the electron properties of graphene in the context of its use in various devices.

One of the ways of modifying the electronic properties of graphene is doping, which is generally performed by replacing carbon atoms with other elements. At the present time, nitrogen is one of the dopants most extensively studied in the case of graphene. It has been demonstrated that nitrogen doping remarkably improves the performance qualities of graphene, especially in lithium-ion batteries, supercapacitors, fuel cells and field-effect transistors.

Nitrogen doping is also advantageous as regards other materials constituted of carbon atoms in the $sp^2$ hybridization state, for instance graphite or carbon nanotubes.

The nitrogen doping of graphene may be performed chemically, for example by heat treatment of graphene oxide in the presence of ammonia (Xu et al., *Journal of Colloid and Interface Science* 2015, 445, 143-150) or of an organic compound comprising nitrogen (Liu et al., *Energy Storage Materials* 2016, 2, 69-75), or by heating a nitrogen-doped graphene precursor, such as pyridine or julolidine (Yasuda et al., *ChemComm* 2013, 49, 9627). However, these processes make use of high temperatures and of toxic chemical compound v ds, thus making them unattractive from an economic and ecological viewpoint.

SUMMARY

The nitrogen doping of graphene may also be performed by exposing graphene to $N^+$ ions and/or to neutral species which have been thermalized with nitrogen, the graphene being brought to high temperature (for example 850° C.) during this exposure (Lin et al., *Carbon* 2014, 73, 216-224) or heat-treated after exposure to temperatures above 700° C. (Sforzini et al., *Physical Review Letters* 2016, 116, 126805), or 550° C., or even 850° C. (Lin et al., *Carbon* 2016, 100, 337-344). However, these processes once again make use of high temperatures thus making them unattractive from an economic viewpoint. Furthermore, these processes are not versatile, the nitrogen being provided by $N^+$ ions and/or thermalized neutral nitrogen species, and not by a readily modifiable gaseous atmosphere. In addition, these methods are liable to bring about substantial defects within the graphene, which may be detrimental for the subsequent applications.

Thus, one of the aspects of the present subject matter is to provide a process for the nitrogen doping of a material comprising carbon atoms in the $sp^2$ hybridization state which is simple to perform and clean, i.e. not involving the use of toxic chemical compounds.

Another aim of the presently disclosed subject matter is to provide a nitrogen doping process in which the production of defects in the irradiated material is of selective and limited nature.

Another aim of the presently disclosed subject matter is to provide a nitrogen doping process which is versatile, also allowing, where appropriate, functionalization of the material via the formation of carbon-oxygen bonds, in particular of carboxyl and/or carbonyl groups.

Thus, the subject matter relates to a process for the nitrogen doping of a material constituted of a set of carbon atoms in the $sp^2$ hybridization state, the process including the following steps:
  placing the material in contact with dinitrogen;
  irradiating the material and the dinitrogen placed in contact with a beam of electrons or of light ions whose energy is greater than or equal to 0.1 MeV, to obtain a material in which some of the carbon atoms in the $sp^2$ hybridization state are nitrogen-doped; the material not being oxidized beforehand in the first step.

The process of the subject matter allows efficient doping of the material, while at the same time being easy to perform and clean, under conditions that are not detrimental for this material.

For example, a material based on nitrogen-doped graphite according to the presently disclosed subject matter was tested as redox electrode with respect to vanadium redox couples used for vanadium redox rechargeable flow batteries. It turns out that the electron exchange rates are appreciably modified for both the oxidation and reduction reactions.

In addition, it has been shown that the doping according to the presently disclosed subject matter is capable of modifying electron output work of the material, in particular of increasing the electron output work of the irradiated material, especially relative to the material annealed at high temperature (for example 10 min at 450° C., under a very high vacuum). Controlling the electron output work may be advantageous for optimizing electronic components such as transistors, photovoltaic cells, chemical detectors, gas detectors or field-effect emitters.

According to an embodiment, the placing in contact a) of the material takes place with a gaseous mixture constituted of or including dinitrogen, in particular a gaseous mixture constituted of air.

Thus, the placing in contact of the material with dinitrogen takes place in the absence of any solution, the dinitrogen being solely provided in the form of a pure gas or mixed with other gases.

The process of the presently disclosed subject matter is, in the absence of any solution, advantageously simple to perform, given that there is no solution to be prepared, and that no step of drying the doped material needs to be envisaged on conclusion of the irradiation.

According to an advantageous embodiment, the gaseous mixture is constituted of dinitrogen and a gas chosen from dioxygen, carbon dioxide, dihydrogen, helium, neon, argon, krypton, xenon and water vapor, and mixtures thereof.

In this case, the material is in contact with:
dinitrogen (as sole gas), or
a gaseous mixture including dinitrogen, or
a gaseous mixture constituted of dinitrogen and of another gas as defined above, or
a gaseous mixture including dinitrogen and another gas as defined above.

According to another advantageous embodiment, the gaseous mixture is constituted of dinitrogen and optionally a gas chosen from dihydrogen, helium, neon, argon, krypton and xenon, and mixtures thereof.

Thus, the material may be in contact with:
dinitrogen (as sole gas), or
a gaseous mixture including dinitrogen, or
a gaseous mixture constituted of dinitrogen and of another gas as defined above, or
a gaseous mixture including dinitrogen and another gas as defined above.

In the case of dinitrogen (as sole gas) or of a gaseous mixture constituted of dinitrogen and of another gas chosen from dihydrogen, helium, neon, argon, krypton and xenon, and mixtures thereof, the nitrogen doping may be performed without the material being functionalized with carbon-oxygen bonds.

According to another advantageous embodiment, the gaseous mixture is constituted of air and/or water vapor, and optionally a gas chosen from dioxygen, carbon dioxide, dihydrogen, helium, neon, argon, krypton and xenon, and mixtures thereof.

In this case, the gaseous mixture allows, besides nitrogen doping, the functionalization of the material with carbon-oxygen bonds.

This functionalization is advantageous especially in the context of the use of the material for the production of redox electrodes, of hydrogen storage devices, and also in catalysis. This functionalization is also advantageous for transparent (photovoltaic) electrodes and for supercapacitors (batteries).

According to a particularly advantageous embodiment, the placing in contact a) of the material takes place with a gaseous mixture constituted of helium and air.

According to a particularly advantageous embodiment, the placing in contact a) of the material takes place with a gaseous mixture constituted of dinitrogen.

According to a particularly advantageous embodiment, the placing in contact a) of the material takes place with a gaseous mixture constituted of dinitrogen and air.

According to a particularly advantageous embodiment, the placing in contact a) of the material takes place with a gaseous mixture constituted of dinitrogen and dihydrogen.

According to another particularly advantageous embodiment, the placing in contact a) of the material takes place with a gaseous mixture constituted of dinitrogen and water vapor, in particular saturated water vapor.

According to another particularly advantageous embodiment, the placing in contact a) of the material takes place with a gaseous mixture constituted of air and water vapor, in particular saturated water vapor.

According to another embodiment, the gaseous mixture also includes a gas chosen from sulfur dioxide, hydrogen sulfide, methane, propane, butane, ethylene, propene, butene, acetylene, propyne, butyne, nitrogen trifluoride, methane trifluoride, sulfur hexafluoride, nitrous oxide, halogenated gases, especially dichlorine, siliceous gases, vapors of organometallic compounds, and mixtures thereof.

The term "siliceous gases" may be defined as any gas containing silicon, for example $SiH_4$.

The vapors of organometallic compounds may be obtained via any method known to those having ordinary skill in the art, in particular those used in the context of organometallic vapor-phase epitaxy.

These gases may also make it possible to functionalize all the carbon atoms in the $sp^2$ hybridization state with carbon-sulfur, carbon-fluorine or other bonds.

According to an embodiment, the set of carbon atoms in the $sp^2$ hybridization state is chosen from graphene, graphite, carbon nanotubes, fullerenes and fullerites, the set in particular being graphene or graphite.

According to another embodiment, the set of carbon atoms in the $sp^2$ hybridization state is supported on a substrate.

When the set of carbon atoms in the $sp^2$ hybridization state is graphene supported on a substrate, the substrate in particular bears one or more graphene monolayers, especially from 1 to 7 graphene monolayers.

According to another embodiment, the substrate is chosen from metals, in particular Ni, semiconductors and insulators, in particular $SiO_2$, glasses and polymers.

According to another embodiment, the set of carbon atoms in the $sp^2$ hybridization state is supported on a substrate, in particular $SiO_2$, and the set of nitrogen-doped carbon atoms in the $sp^2$ hybridization state, obtained on conclusion of step b), is also doped with at least one of the atoms of the support, in particular Si.

According to an embodiment, the set of carbon atoms in the $sp^2$ hybridization state is in powder form.

The powder, especially graphene or graphite may be prepared via the powder reduction techniques that are well known to those having ordinary skill in the art.

According to an embodiment, the energy of the electron or light ion beam is greater than or equal is 0.2; 0.3 or 0.4 MeV.

According to another embodiment, the beam is an electron beam.

According to a particular embodiment, the electrons have an energy ranging from 0.1 to 10 MeV, in particular from 0.1 to 5 MeV or from 0.4 to 5 MeV, more particularly from 0.4 to 2.5 MeV, even more particularly from 1.0 to 2.5 MeV, the set of carbon atoms in the $sp^2$ hybridization state especially being supported on a substrate.

According to another particular embodiment, the electrons have an energy ranging from 2.5 to 10 MeV, the set of carbon atoms in the $sp^2$ hybridization state especially being supported on a substrate or in powder form.

According to another embodiment, the beam is a light ion beam.

According to an advantageous embodiment, the light ions are chosen from $H^+$ and $He^+$.

According to another advantageous embodiment, the light ions have an energy ranging from 0.1 MeV to 45 MeV, in particular from 0.4 MeV to 45 MeV.

According to an embodiment, the irradiation time of step b) ranges from 1 minute to 72 hours, in particular from 5 minutes to 14 or 15 hours.

Variation in the irradiation time makes it possible to obtain nitrogen doping within a wide percentage range.

According to an embodiment, the electron beam flux ranges from $3 \times 10^{11}$ to $4 \times 10^{13}$ e–·cm$^{-2}$·s$^{-1}$, in particular $1.4 \times 10^{12}$ to $1.9 \times 10^{13}$ e–·cm$^{-2}$·s$^{-1}$.

According to another embodiment, the light ion beam flux ranges from $3 \times 10^7$ to $6 \times 10^{11}$ e–·cm$^{-2}$·s$^{-1}$.

According to an embodiment, the electron or light ion beam fluence ranges from $1.8 \times 10^9$ to $10^{19}$ e–·cm$^2$, in particular from $6.7 \times 10^{15}$ to $7.2 \times 10^{16}$ e–·cm$^{-2}$.

According to an embodiment, the presently disclosed subject matter relates to a process as defined previously, in which, during the irradiation b), the beam irradiates the dinitrogen, and then the material constituted of a set of carbon atoms in the sp$^2$ hybridization state.

In this case, the electron beam first encounters the dinitrogen, especially in gas form, and then strikes the material, and next, where appropriate, the substrate.

According to another embodiment, the presently disclosed subject matter relates to a process as defined previously, in which, during the irradiation b), the beam irradiates the material constituted of a set of carbon atoms in the sp$^2$ hybridization state, and then the dinitrogen.

In this case, the electron beam first encounters, where appropriate, the substrate, and then the material and subsequently the dinitrogen, especially in gas form.

According to another embodiment, the presently disclosed subject matter relates to a process as defined previously, in which the atomic percentage of nitrogen of the nitrogen-doped carbon atoms in the sp$^2$ hybridization state is greater than or equal to 0.5 at %, in particular greater than or equal to 1.0 at %.

According to an advantageous embodiment, the presently disclosed subject matter relates to a process as defined previously, in which the atomic percentage of nitrogen of the set of nitrogen-doped carbon atoms in the sp$^2$ hybridization state is greater than or equal to 2.5 at %, in particular greater than or equal to 3.0 at %, 3.5 at % or 4.0 at %, the gaseous mixture in particular including dinitrogen and water vapor.

Thus, the process according to the presently disclosed subject matter allows efficient doping of the material, while at the same time being simple to perform and clean, and under conditions that are not detrimental to this material.

According to another embodiment, the presently disclosed subject matter relates to a process as defined previously, in which the doping includes the incorporation of nitrogen atoms into the set of carbon atoms in the sp$^2$ hybridization state in the form of pyrrole nitrogen, pyridine N-oxide nitrogen, nitrogen of N-pyridone type, nitro groups —NO$_2$, nitroso groups —N=O, and/or of nitrate groups —O—NO$_2$, the gaseous mixture in particular including helium and air.

According to an embodiment, the subject matter relates to a process as defined previously, in which the doping includes the incorporation of nitrogen atoms into the set of carbon atoms in the sp$^2$ hybridization state in the form of nitro groups —NO$_2$, and/or nitrate groups —O—NO$_2$, the gaseous mixture in particular including dinitrogen and water vapor.

According to an embodiment, the subject matter relates to a process as defined previously, in which the doping includes the incorporation of nitrogen atoms into the set of carbon atoms in the sp$^2$ hybridization state in the form of nitro groups —NO$_2$, and/or nitrate groups —O—NO$_2$, the gaseous mixture in particular including air and water vapor, more particularly saturated water vapor.

According to another embodiment, the presently disclosed subject matter relates to a process as defined previously, in which the doping includes the incorporation of nitrogen atoms into the set of carbon atoms in the sp$^2$ hybridization state in the form of nitro groups —NO$_2$, and/or nitrate groups —O—NO$_2$, the gaseous mixture in particular including dinitrogen and air.

According to another embodiment, the presently disclosed subject matter relates to a process as defined previously, in which the doping includes the incorporation of nitrogen atoms into the set of carbon atoms in the sp$^2$ hybridization state in the form of pyrrole nitrogens and/or nitrogen of N-pyridone type, the gaseous mixture in particular including dinitrogen and water vapor, more particularly saturated water vapor.

According to another embodiment, the presently disclosed subject matter relates to a process as defined previously, in which the doping includes the incorporation of nitrogen atoms into the set of carbon atoms in the sp$^2$ hybridization state in the form of pyrrole nitrogens and/or nitrogen of N-pyridone type, the gaseous mixture in particular including dinitrogen and dihydrogen.

According to another embodiment, the presently disclosed subject matter relates to a process as defined previously, in which the doping includes the incorporation of nitrogen atoms into the set of carbon atoms in the sp$^2$ hybridization state in the form of pyrrole nitrogens, of nitrogen of N-pyridone type, of nitro groups —NO$_2$, and/or of nitrate groups —O—NO$_2$, the gaseous mixture including or being constituted in particular of dinitrogen.

According to an embodiment, the set of nitrogen-doped carbon atoms in the sp$^2$ hybridization state, obtained on conclusion of step b), is also functionalized with groups including oxygen, in particular groups including one or more carbon-oxygen bonds, more particularly carboxyl and/or carbonyl groups.

The presently disclosed subject matter also relates to a material that may be obtained via the process defined previously.

The presently disclosed subject matter also relates to a material constituted of a set of carbon atoms in the sp$^2$ hybridization state, of which some of the set of carbon atoms in the sp$^2$ hybridization state is doped with nitrogen, and in which:

the atomic percentage of nitrogen of the set of nitrogen-doped carbon atoms in the sp$^2$ hybridization state is greater than or equal to 0.5 at %, in particular greater than or equal to 1.0 at % or 1.2 at %; and the atomic percentage of nitrogen of the set of nitrogen-doped carbon atoms in the sp$^2$ hybridization state in the form of nitro groups —NO$_2$, and/or nitrate groups —O—NO$_2$ is greater than or equal to 0.1 at %, in particular greater than or equal to 0.3 at % or 0.4 at %.

According to an embodiment, this material is such that the atomic percentage of nitrogen of the set of nitrogen-doped carbon atoms in the sp$^2$ hybridization state is greater than or equal to 1.5 at %, in particular greater than or equal to 2.5 at % or 4.0 at %; and the atomic percentage of nitrogen of the set of nitrogen-doped carbon atoms in the sp$^2$ hybridization state in the form of nitro groups —NO$_2$, and/or nitrate groups —O—NO$_2$ is greater than or equal to 1.3 at %, in particular greater than or equal to 2.0 at % or 3.0 at %.

According to another embodiment, the set of carbon atoms in the sp$^2$ hybridization state is chosen from graphene, graphite, carbon nanotubes, fullerenes and fullerites, the set in particular being graphene or graphite.

According to another embodiment, the set of carbon atoms in the sp$^2$ hybridization state is supported on a substrate.

When the set of carbon atoms in the sp$^2$ hybridization state is graphene supported on a substrate, the substrate in particular bears one or more graphene monolayers, especially from 1 to 7 graphene monolayers.

According to an embodiment, the substrate is chosen from metals, in particular Ni, semiconductors and insulators, in particular SiO$_2$, glasses and polymers.

According to an embodiment, the set of carbon atoms in the sp$^2$ hybridization state is supported on a substrate, in particular SiO$_2$, and the set of nitrogen-doped carbon atoms in the sp$^2$ hybridization state, obtained on conclusion of step b), is also doped with at least one of the atoms of the support, in particular Si.

According to an embodiment, the set of carbon atoms in the sp$^2$ hybridization state is in powder form.

According to another embodiment, the set of nitrogen-doped carbon atoms in the sp$^2$ hybridization state, obtained on conclusion of step b), is also functionalized with groups including oxygen, in particular groups including one or more carbon-oxygen bonds, more particularly carboxyl and/or carbonyl groups.

The expression "set of carbon atoms in the $sp^2$ hybridization state" may be defined as a set in which each carbon atom, with the exception of the carbon atoms at the edge of this set, is bonded to three other carbon atoms via covalent links of sigma type for its three $sp^2$ electrons, and covalent links of $\pi$ type for its other p electron.

The set may also have defects, which are well known to those having ordinary skill in the art. In this case, there are, for example, carbon atoms not bonded to three other carbon atoms. They may then be bonded to four carbon atoms (spa hybridization).

This set may also be doped and/or functionalized as mentioned above and defined below.

The term "nitrogen doping" may be defined as the incorporation of nitrogen atoms into the set of carbon atoms in the $sp^2$ hybridization state.

The incorporation is, for example, the direct substitution of a carbon atom with a nitrogen atom. It is then referred to as graphitic nitrogen. This incorporation may also be done by bonding a nitrogen atom to two carbon atoms to form a ring of six atoms or five atoms. This is then referred to, respectively, as pyridinic and pyrrole nitrogen.

The term "the placing in contact of the material with dinitrogen" may be defined as the placing in contact of at least the set of carbon atoms in the $sp^2$ hybridization state of the material with dinitrogen, in particular in gas form.

The term "irradiation of the material" may be defined as the irradiation of at least part of the set of carbon atoms in the $sp^2$ hybridization state.

The term "irradiation of the material and of the dinitrogen placed in contact" may be defined as the placing in contact of step a) continues during step b), and that both the material and the dinitrogen are irradiated during this step b).

The term "the material not being oxidized prior to step a)" may be defined as the material constituted of a set of carbon atoms in the $sp^2$ hybridization state is not a material constituted of graphene oxide before the step a) of placing in contact with dinitrogen.

The term "functionalization with carbon-oxygen bonds" may be defined as certain carbon atoms of the set bear a carbon-oxygen bond. In particular, certain carbon atoms of the set then bear a carbonyl or carboxyl group.

The term "irradiation with an electron or light-ion beam" in particular may be defined as irradiation in fixed mode. An irradiation zone is, for example, defined on the material to be doped, the irradiation is performed on a part of this zone, in a fixed mode, under the conditions, especially the time conditions, defined in the present description, and a new part of the zone is then optionally irradiated. This last step is optionally reproduced until all of the irradiation zone under consideration has been irradiated.

The term "the material not being oxidized prior to step a)" especially may be defined as the material subjected to steps a) and b) is not graphene oxide.

The term "flux" may be defined as the number of electrons or of light ions per unit time and per unit area.

The term "fluence" may be defined as the total number of electrons or of light ions per unit area.

The term "saturated water vapor" may be defined as water vapor at a pressure P corresponding to the saturating vapor pressure. This saturated water vapor is wet when it is in the presence of liquid water, and dry when it is not.

DETAILED DESCRIPTION OF EXEMPLARY EMBODIMENTS

Materials

Figure 1:
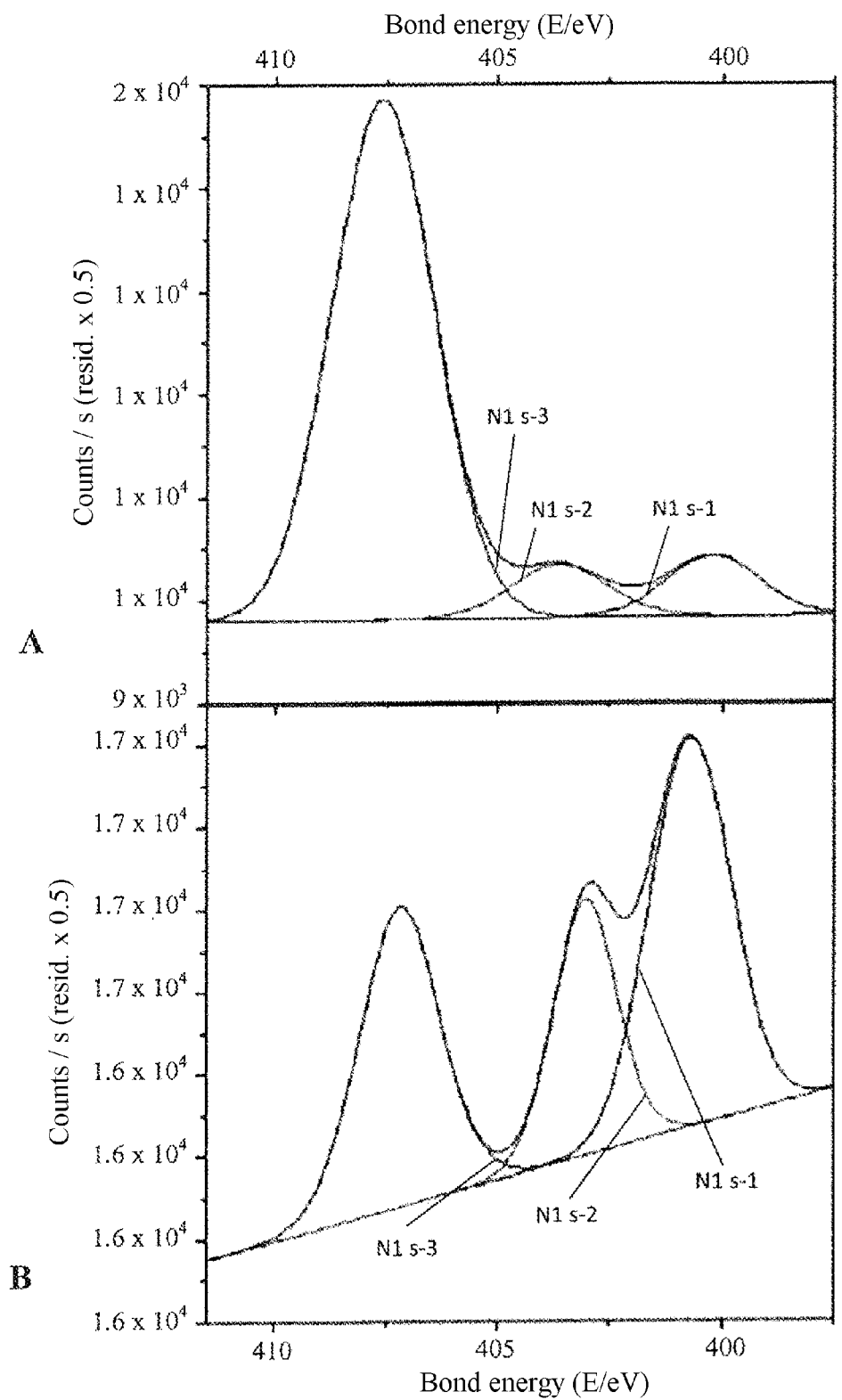
FIG. 1 illustrates the resolution of the various components of the nitrogen XPS peaks, N1s-1, N1s-2, N1s-3, determined from the XPS data obtained for graphene on an Ni substrate (Graphene Supermarket) irradiated at the same electron energy, 2.5 MeV, at the same flux (×1) and at the same fluence (×14), namely G8 (example 2, FIG. 1A) and G9 (example 1, FIG. 1B). The thickness of the graphene on the Ni substrate ranges from 1 to 7 layers on domains of about 2 to 5 μm (Graphene Supermarket).

The graphene on Ni substrate comes from Graphene Supermarket (Graphene Laboratories Inc.); they are 10 mm×10 mm samples. The graphene on $SiO_2$ substrate comes from Graphenea (Graphena Monolayer Graphene film).

The electron beam irradiations were performed using a Pelletron accelerator, supplying electrons of high energy (150 keV-2.5 MeV) and at variable current (150 nA-200 μA), and manufactured by the company NEC. The irradiations with an electron beam in the 2.5-10 MeV range are performed with a 10 MeV LINAC.

The irradiations with a light-ion beam in the 0.4-3 MeV range are performed with a Pelletron manufactured by the company NEC and in the 3-45 MeV range with a cyclotron.

The measurement of the percentages of elements at the surface of the irradiated samples is performed by X ray photoelectron spectrometry (XPS) using a THERMO-VG ESCALAB 250 spectrometer equipped with an RX K→Al source (1486.6 eV).

Methods

In examples 1 to 4 that follow, the irradiation geometry used is as follows: the beam passes through the gas layer in contact with the graphene on a substrate and then enters the graphene and then the substrate. The irradiation creates radicals in the gas layer at the surface and also defects in the crystal structure of the surface with partial destruction of the bonds between carbon.

which the nominal flux values vary in ratios from 1 to 10 (table 1), the flux values vary in ratios from 1 to 11.9. The fluences vary in ratios from 1 to 10.8 instead of ratios from 1 to 14 for the nominal values (table 1).

The fluxes used vary within the range ($1.4 \times 10^{12}$ to $1.9 \times 10^{13}$) e–·cm$^{-2}$·s$^{-1}$ and the fluences in the range ($6.7 \times 10^{15}$ to $7.2 \times 10^{16}$) e–·cm$^{-2}$ (table 1). It is possible to broaden the range of fluxes used, for example from ($3 \times 10^{11}$ to $4 \times 10^{13}$) e–·cm$^{-2}$·s$^{-1}$.

TABLE 1

List of the graphene samples irradiated with an electron beam emitted by the pelletron, and of the corresponding irradiation conditions.

| Exp. | Irrad. time | MeV | CE/ µA | Flux/ Flux0 | Fluence/ Fluence0 | Flux0 e–·cm$^{-2}$·s$^{-1}$ | Flux e–·cm$^{-2}$·s$^{-1}$ | Flux/ Fxmin | Fluence e–·cm$^{-2}$ | Fluence/ Femin |
|---|---|---|---|---|---|---|---|---|---|---|
| G9 | 14 h | 2.5 | 1.2 | 1 | 14 | $1.44 \times 10^{12}$ | $1.44 \times 10^{12}$ | 1 | $7.27 \times 10^{16}$ | 10.8 |
| E9 | 1 + 1 + 1 = 3 h | 1.5 | 1.2 | 1 | 3 | $1.87 \times 10^{12}$ | $1.87 \times 10^{12}$ | 1.29 | $2.0 \times .10^{16}$ | 3 |
| E7 | 6 min | 1 | 12 | 10 | 1 | $1.87 \times 10^{13}$ | $1.87 \times 10^{13}$ | 12.9 | $6.72 \times 10^{15}$ | 1 |

The percentages of the elements at the surface of the irradiated samples are measured by XPS according to a procedure in which long pumping under vacuum is performed to condition the surfaces. This method differs from the standard XPS analysis procedures which perform thermal annealing at high temperature, about 450-550° C., over a short period (for example 10 min), before the measurements.

Determination of the electron extraction work Photoelectron emission spectroscopy (XPEEM) was used to perform an imaging spectroscopic analysis. In particular, maps of the electron extraction work were determined for a reference graphene/Ni layer and a treated layer (G9) using the procedure described by Wang et al. (*Carbon* 2015, 82, 360-367).

Example 1: Nitrogen Doping of Graphene on an Ni Substrate, Under a Helium/Air Atmosphere Samples of graphene on an Ni substrate were irradiated under a helium/air atmosphere under the conditions described in table 1 below. The pressure of the mixture is 1 atm with a partial pressure of 0.9 atm for He and 0.1 atm for air.

The flux/flux0 ratios in table 1 correspond to the ratios of the ICE currents which make it possible to adjust the pelletron electron beam. The value flux0 is the nominal value of the number of electrons emitted per unit time and area for the minimal ICE current used in the present tests, and is indicated for each test in table 1. The nominal value fluence0 corresponds to irradiation for a time of one hour for an electron flux of value flux0.

The flux values on the graphene layers depend on the adjustment of the pelletron electron beam. The calibration curve, Itarget=f(ICE), makes it possible to determine them from the nominal flux values. For the tests performed in The columns entitled "MeV", "CE/µA", "flux/flux0" and "fluence/fluence0" indicate, respectively, the electron energy, the beam current, if the irradiation has taken place over the entire layer or not, the ratio of the irradiation fluxes and fluences at the lowest nominal values used. The flux and fluence columns indicate the flux and fluence values which irradiate the graphene monolayers on the substrate. The flux/fxmin and fluence/femin columns indicate the respective ratios thereof at the minimum values used in the tests.

Results

The percentages of the elements at the surface of the samples irradiated as indicated previously are collated in table 2 below.

TABLE 2

Percentages of the elements at the surface of the irradiated samples determined by XPS. G7-ref corresponds to a non-irradiated sample of graphene on an Ni substrate.

| | XPS: atom (%) | | | | |
|---|---|---|---|---|---|
| Exp. | C 1s | N 1s | Ni 2p | O 1s | Si 2p |
| G7-ref | 79.54 | 0 | 4.74 | 9.47 | 6.3 |
| G9 | 59.85 | 1.3 | 4.38 | 28.5 | 6 |
| E9 | 69.69 | 0.9 | 3.13 | 20.1 | 6.2 |
| E7 | 71.25 | 0.6 | 3.91 | 19 | 5.3 |

Thus, nitrogen doping is observed for both 1 MeV low-energy electrons and 2.5 MeV high-energy electrons in a flux range which varies from 1 to 10 and fluences which vary in a ratio from 1 to 14.

These data show that there is also functionalization of the carbon with groups including oxygen, in particular carboxyl and/or carbonyl groups.

Example 2: Nitrogen Doping of Graphene on an Ni Substrate, Under a Humid Atmosphere Samples of graphene on an Ni substrate were irradiated under an atmosphere of air humidified by the presence of saturated water vapor, under the conditions described in table 3 below.

TABLE 3

List of graphene samples irradiated with an electron beam emitted by the pelletron, and the corresponding irradiation conditions.

| Exp. | Irrad. time | MeV | CE/ μA | Flux/ Flux0 | Fluence/ Fluence0 | Flux0 e- · cm$^{-2}$ · s$^{-1}$ | Flux e- · cm$^{-2}$ · s$^{-1}$ | Flux/ Fxmin | Fluence e- · cm$^{-2}$ | Fluence/ Femin |
|---|---|---|---|---|---|---|---|---|---|---|
| G8 | 14 h | 2.5 | 1.2 | 1 | 14 | $1.44 \times 10^{12}$ | $1.44 \times 10^{12}$ | 1 | $7.27 \times 10^{16}$ | 10.8 |
| E10 | 1 + 1 + 1 = 3 h | 1.5 | 1.2 | 1 | 3 | $1.87 \times 10^{12}$ | $1.87 \times 10^{12}$ | 1.29 | $2.01 \times 10^{16}$ | 3 |

Results

The percentages of the elements at the surface of the samples irradiated as indicated previously are collated in table 4 below.

TABLE 4

Percentages of the elements at the surface of the irradiated samples determined by XPS

| | XPS: atom (%) | | | | |
|---|---|---|---|---|---|
| Exp. | C 1s | N 1s | Ni 2p | O 1s | Si 2p |
| G7-ref | 79.54 | 0 | 4.74 | 9.47 | 6.3 |
| G8 | 57.56 | 4.2 | 4.59 | 29.1 | 4.6 |
| E10 | 64.02 | 2.6 | 4.63 | 25.6 | 3.1 |

Thus, the nitrogen doping is observed for both 1.5 MeV energy electrons and 2.5 MeV high-energy electrons in a range of fluences which vary within a ratio from 1 to 4.67.

These data show that there is also functionalization of carbon with groups including oxygen, in particular carboxyl and/or carbonyl groups.

Example 3: Nitrogen Doping of Graphene on an SiO$_2$ Substrate, Under a Helium/Air Atmosphere Samples of graphene on an SiO$_2$ substrate were irradiated under a helium/air atmosphere under the conditions described in table 5 below. The pressure of the mixture is 1 atm with a partial pressure of 0.9 atm for He and of 0.1 atm for air.

TABLE 5

Samples of graphene irradiated with an electron beam emitted by the pelletron, and corresponding irradiation conditions.

| Exp. | Irrad. time | MeV | CE/ μA | Flux/ Flux0 | Fluence/ Fluence0 | Flux0 e- · cm$^{-2}$ · s$^{-1}$ | Flux e- · cm$^{-2}$ · s$^{-1}$ | Flux/ Fxmin | Fluence e- · cm$^{-2}$ | Fluence/ Femin |
|---|---|---|---|---|---|---|---|---|---|---|
| Gs1 | 1 + 1 + 1 = 3 h | 1.5 | 1.2 | 1 | 3 | $1.87 \times 10^{12}$ | $1.87 \times 10^{12}$ | 1.29 | $2.01 \times 10^{16}$ | 1 |

Results

The percentages of the elements at the surface of the sample irradiated as indicated previously are collated in table 6 below.

TABLE 6

Percentages of the elements at the surface of the irradiated sample Gs1 determined by XPS

| | XPS: atom (%) | | | | |
|---|---|---|---|---|---|
| Exp. | C 1s | N 1s | Ni 2p | O 1s | Si 2p |
| G7-ref | 79.54 | 0 | 4.74 | 9.47 | 6.3 |
| Gs1 | 26.26 | 1.1 | 0 | 44.7 | 28 |

Thus, the amount of nitrogen introduced into the surface of the graphene on an $SiO_2$ substrate is close to that introduced under the same conditions onto the surface of the graphene on an Ni substrate (sample E9 of example 1), showing the great versatility of the process of the presently disclosed subject matter as regards substrates bearing the irradiated sample.

The data of table 6 show that there is also functionalization of the carbon with groups including oxygen, in particular carboxyl and/or carbonyl groups.

Example 4: Configuration of the Nitrogen-Doped Samples

Analysis of the distribution of the bond energies of the photoelectrons obtained from the photoelectron spectroscopy (XPS) data shows that the nitrogen dopant has several bonding states which correspond to the energies of the ranges (a) 400.2-400.7, (b) 403.01-403.63 and (c) 407.18-407.59 eV, for G9 (example 1) and G8 (example 2).

FIG. 1 shows that the population of the various types of bond of the nitrogen dopant is greatly dependent on the atmosphere (helium/air or humid air) placed in contact with the sample to be doped, before irradiation at 2.5 MeV at low flux (×1) and high fluence (×14). The atmosphere of humid air type almost exclusively promotes nitrogen N1s-3. The atmosphere of helium/air type makes it possible to populate the three types of bond with a slightly higher probability for N1s-1 than for N1s-2 and N1s-3.

Table 7 below gives the domain and the mean values of the bond energies of the electrons corresponding to the various components N1s-n determined in the XPS spectra, and also the identification of these components.

TABLE 7

| Component N1s | Emin-Emax (dE) in eV | E(eV) | nature |
|---|---|---|---|
| N1s-1 | 399.9-400.69 (0.7) | 400.23 | N-pyrrole; N-pyridone. |
| N1s-2a | 402.3(0) | 402.30 | N-N. |
| N1s-2b | 403.01-403-63(0.62) | 403.26 | N-pyridine oxide; N-nitroso. |
| N1s-3 | 406.83-407.59(0.76) | 407.20 | N-nitro; N-nitrate |

Example 5: Nitrogen Doping of Graphene with Modified Irradiation Geometry

In this example, the beam passes first through the substrate, and then the graphene, and finally arrives in the gas in contact with the graphene.

Samples of graphene on an Ni, Cu, $SiO_2$ or SiC substrate are irradiated under an atmosphere of $N_2$, $N_2/H_2(5\%)$, $N_2$/saturating water vapor, $N_2/H_2(5\%)$/saturating water vapor, $N_2$/alkene, $N_2$/alkyne, $N_2/H_2S$, $N_2/O_2$, $N_2/SO_2$, He (0.9 atm)/air (0.1), or air (saturating water vapor) (see in particular examples 1 and 2) with electrons which have at the graphene/gas interface energies in the 0.4-2.5 MeV range for flux and fluence conditions, respectively, in the ranges $(3 \times 10^{11}$ to $4 \times 10^{13})$ e-·$cm^{-2}$·$s^{-1}$ and $(1.8 \times 10^{13}$ to $1 \times 10^{19})$ e-·$cm^{-2}$.

Example 6: Nitrogen Doping of Graphite Composites

Disks (8-10 mm diameter) of graphite composites (PVDF) BMA-5 used in industry as structural elements in fuel cells, were irradiated under oxidative conditions under an atmosphere of He (0.9 atm)/air(0.1 atm), air (saturating water vapor), at 1.5 MeV under flux and fluence conditions comparable to those of graphene, in particular under the following conditions:

TABLE 8

| Exp. | Irrrad. time | MeV | CE/ μA | Flux/ Flux0 | Fluence/ Fluence0 | Flux0 e-·$cm^{-2}$·$s^{-1}$ | Flux e-·$cm^{-2}$·$s^{-1}$ | Flux/ Fxmin | Fluence e-·$cm^{-2}$ | Atmosphere |
|---|---|---|---|---|---|---|---|---|---|---|
| BMA-MP_1 5-5 | 3 h = 1 h + 1 h + 1 h | 1.5 | 1.2 | 1 | 3 | 1.44E+12 | 1.44E+12 | 1.00E+00 | 1.56E+16 | He (0.9 atm)/ air (0.1) |
| BMA-MP_1 5-6 | 3 h = 1 h + 1 h + 1 h | 1.5 | 1.2 | 1 | 3 | 1.44E+12 | 1.44E+12 | 1.00E+00 | 1.56E+16 | air + water vapor |

These disks, once doped with nitrogen, were then tested as redox electrode with respect to vanadium redox couples used for rechargeable flow batteries of vanadium redox type. It turns out that the electron exchange rates are appreciably modified for both the oxidation and reduction reactions.

Example 7: Nitrogen Doping of Graphene on an Ni Substrate, Under Various Atmospheres Samples of graphene on an Ni substrate were irradiated under an atmosphere as described in table 9 below, under the conditions described in table 10 below.

TABLE 10

List of graphene samples irradiated with an electron beam emitted by the pelletron, and the corresponding irradiation conditions.

| Experiment | Atmosphere |
|---|---|
| A3(2) | $H_2$ (3%)/$N_2$ 1.1 bar |
| E3(2) | $N_2$ 1.1 bar |
| E5(2) | $N_2$ 0.6 bar; Air 0.4 bar |
| G1(2) | $N_2$ 1.1 bar; saturating water vapor |
| A5(2) | $H_2$ (3%)/$N_2$ 1.1 bar |
| E1(2) | $N_2$ 1.1 bar |
| E9(2) | $N_2$ 1.1 bar; saturating water vapor |

| Exp. | Irrad. time | MeV | CE/ $\mu A$ | Flux/ Flux0 | Flux0 e-·$cm^{-2}$·$s^{-1}$ | Flux e-·$cm^{-2}$·$s^{-1}$ | Flux/ Fxmin | Fluence e-·$cm^{-2}$ | Fluence/ Femin |
|---|---|---|---|---|---|---|---|---|---|
| A3(2) | 1 + 1 + 1 = 3 h | 1.5 | 1.2 | 1 | $2.51 \times 10^{12}$ | $2.51 \times 10^{12}$ | 1 | $2.71 \times 10^{16}$ | 3 |
| E3(2) | 1 + 1 + 1 = 3 h | 1.5 | 1.2 | 1 | $2.51 \times 10^{12}$ | $2.51 \times 10^{12}$ | 1 | $2.71 \times 10^{16}$ | 3 |
| E5(2) | 1 + 1 + 1 = 3 h | 1.5 | 1.2 | 1 | $2.51 \times 10^{12}$ | $2.51 \times 10^{12}$ | 1 | $2.71 \times 10^{16}$ | 3 |
| G1(2) | 1 + 1 + 1 = 3 h | 1.5 | 1.2 | 1 | $2.51 \times 10^{12}$ | $2.51 \times 10^{12}$ | 1 | $2.71 \times 10^{16}$ | 3 |
| A5(2) | 14 h 19 | 1.5 | 1.2 | 1 | $2.51 \times 10^{12}$ | $2.51 \times 10^{12}$ | 1 | $1.30 \times 10^{17}$ | 14.32 |
| E1(2) | 13 h 21 | 1.5 | 1.2 | 1 | $2.51 \times 10^{12}$ | $2.51 \times 10^{12}$ | 1 | $1.21 \times 10^{17}$ | 13.35 |
| E9(2) | 14 h 28 | 1.5 | 1.2 | 1 | $2.51 \times 10^{12}$ | $2.51 \times 10^{12}$ | 1 | $1.30 \times 10^{17}$ | 14.47 |

Results

Figure 2:
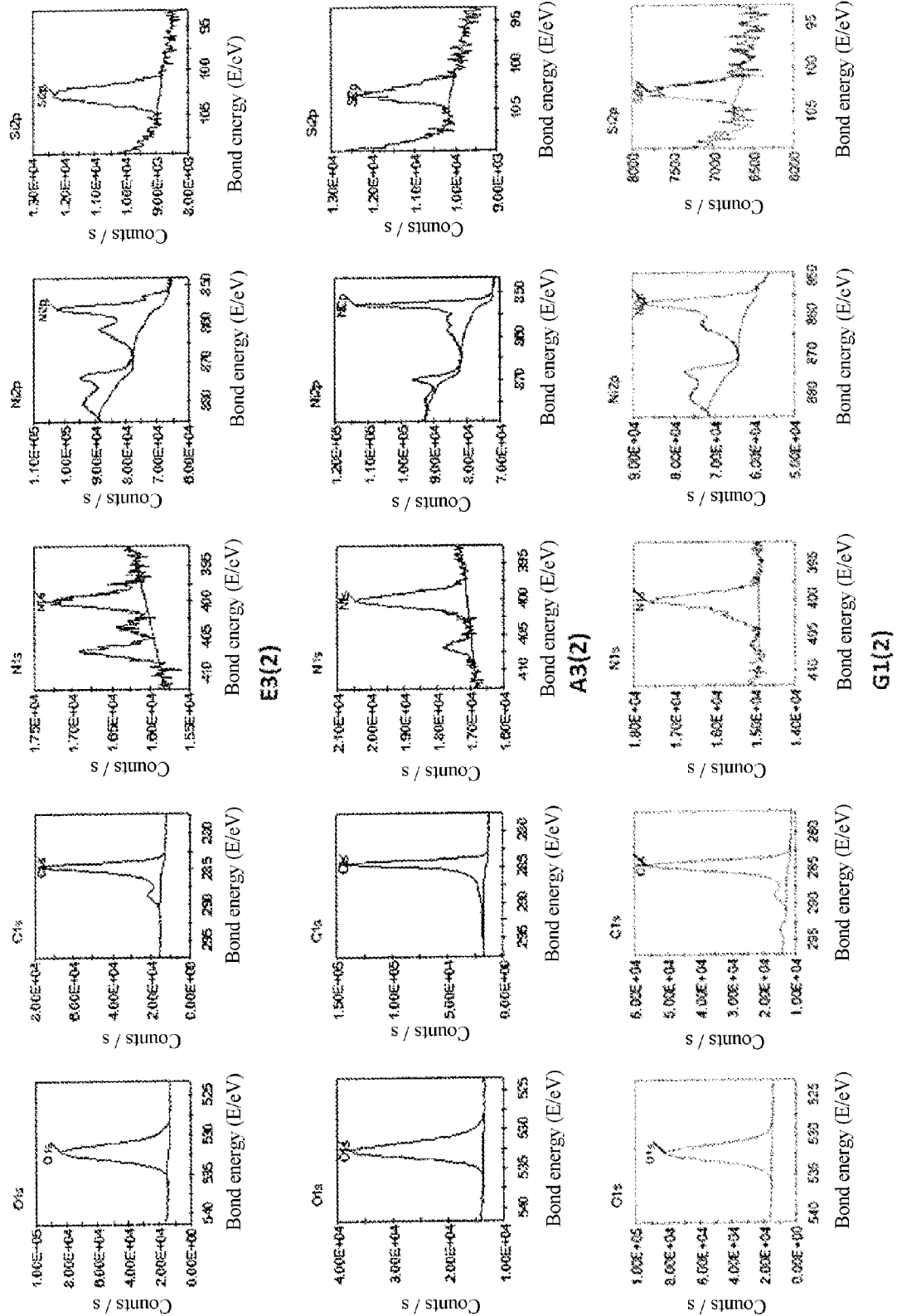
FIG. 2 shows the analysis of the distribution of the bond energies of the photoelectrons obtained from the photoelectron spectroscopy (XPS) data for samples E3(2), A3(2) and G1(2) of example 7.
Figure 3:
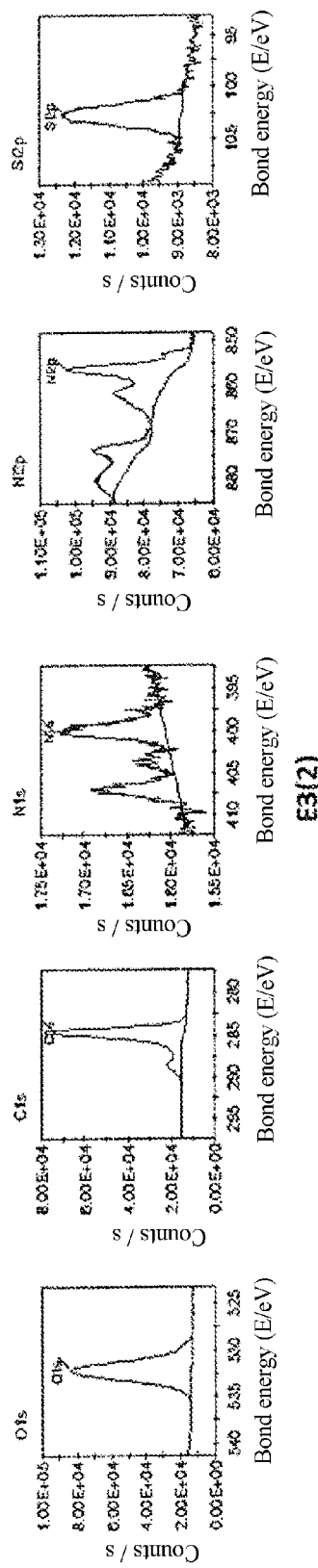
FIG. 3 shows the analysis of the distribution of the bond energies of the photoelectrons obtained from the photoelectron spectroscopy (XPS) data for samples E3(2) and E5(2) and G1(2) of example 7.
Figure 4:
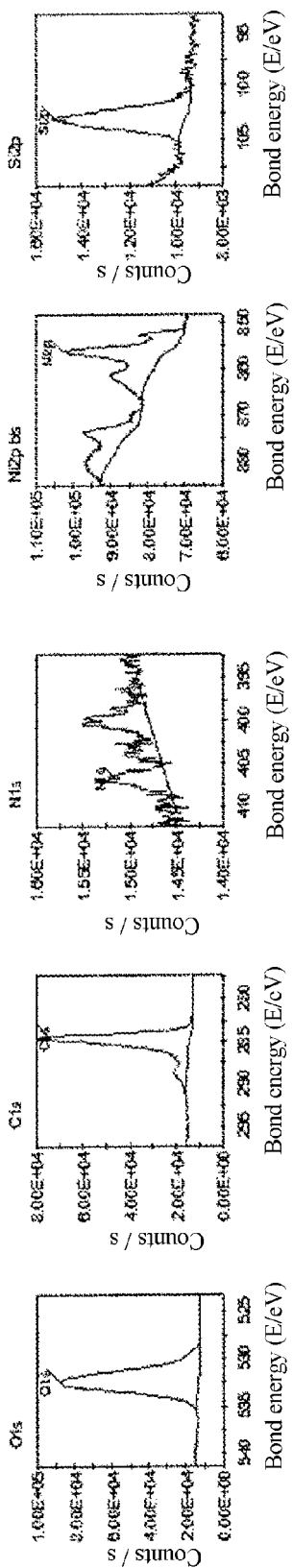
FIG. 4 shows the analysis of the distribution of the bond energies of the photoelectrons obtained from the photoelectron spectroscopy (XPS) data for samples E1 (2) and A5(2) and E9(2) of example 7.
Figure 4:
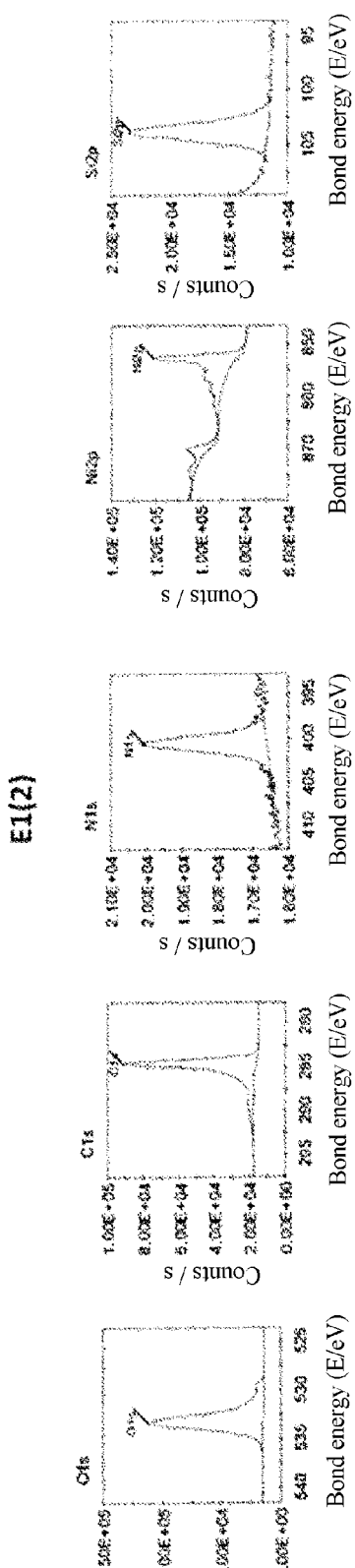
Figure 4:
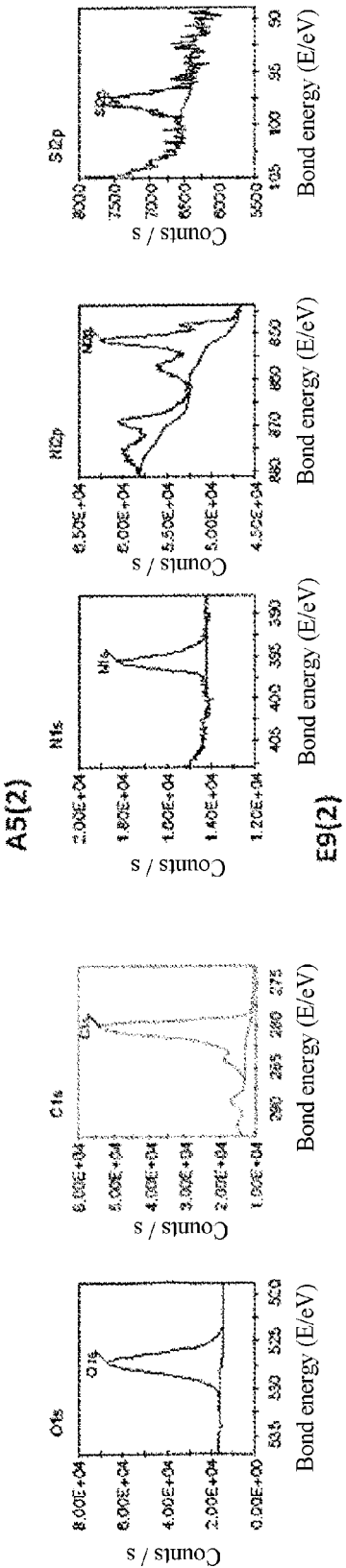

Analysis of the distribution of the bond energies of the photoelectrons obtained from the photoelectron spectroscopy (XPS) data of the samples mentioned above is given in FIGS. 2, 3 and 4.

The invention claimed is:

1. A process for the nitrogen doping of a material comprising a set of carbon atoms in the $sp^2$ hybridization state, the process comprising:
   placing the material in contact with $N_2$; and
   irradiating the material and the $N_2$ placed in contact with a beam of electrons or of light ions, selected among the group of $H^+$ and $He^+$, whose energy is greater than or equal to 0.1 MeV, to obtain a material wherein some of the carbon atoms in the $sp^2$ hybridization state is nitrogen-doped,
   wherein the placing the material in contact with $N_2$ takes place with the further addition of:
   a gaseous mixture including helium and air; or
   a gaseous mixture further including air and water vapor.

2. The process as according to claim 1, wherein the placing in contact of the material takes place with a gaseous mixture including $N_2$, wherein the gaseous mixture includes air.

3. The process as according to claim 2, wherein the gaseous mixture also includes a gas selected from the group consisting of dioxygen, carbon dioxide, dihydrogen, helium, neon, argon, krypton, xenon and water vapor, and mixtures thereof.

4. The process as according to claim 1, wherein the water vapor is a saturated water vapor.

5. The process as according to claim 1, wherein the set of carbon atoms in the $sp^2$ hybridization state is chosen from graphene, graphite, carbon nanotubes, fullerenes and fullerites.

6. The process as according to claim 1, wherein the set of carbon atoms in the $sp^2$ hybridization state is supported on a substrate, chosen from metals, semiconductors and insulators.

7. The process as according to claim 6, wherein the metal is Ni.

8. The process as according to claim 6, wherein the insulator is chosen from $SiO_2$, glasses and polymers.

9. The process as according to claim 1, wherein the set of carbon atoms in the $sp^2$ hybridization state is in powder form.

10. The process as according to claim 1, wherein the beam is an electron beam.

11. The process as according to claim 10, wherein the electrons have an energy ranging from 0.1 to 10 MeV, the set of carbon atoms in the $sp^2$ hybridization state being supported on a substrate.

12. The process as according to claim 10, wherein the electrons have an energy ranging from 2.5 to 10 MeV, the set of carbon atoms in the $sp^2$ hybridization state being supported on a substrate or in powder form.

13. The process as according to claim 1, wherein the irradiation time ranges from 1 minute to 72 hours.

14. The process as according to claim 1, wherein:
    the flux of the electron beam ranges from $3 \times 10^{11}$ to $4 \times 10^{13}$ e-·$cm^{-2}$·$s^{-1}$; or
    the flux of the light ion beam ranges from $3 \times 10^7$ to $6 \times 10^{11}$ e-·$cm^{-2}$·$s^{-1}$; and/or
    the fluence of the electron or light-ion beam ranges from $1.8 \times 10^9$ to $10^{19}$ e-·$cm^{-2}$.

15. The process as according to claim 1, wherein, during the irradiation:
    the beam irradiates the dinitrogen, and then the material including a set of carbon atoms in the $sp^2$ hybridization state; or
    the beam irradiates the material including a set of carbon atoms in the $sp^2$ hybridization state, and then the dinitrogen.

16. The process as according to claim 1, wherein the set of nitrogen-doped carbon atoms in the $sp^2$ hybridization state is also functionalized with carbon-oxygen bonds.

17. The process as according to claim 1, wherein the light ions have an energy ranging from 0.1 MeV to 45 MeV when the beam is a beam of light ions selected among the group of $H^+$ and $He^+$.

* * * * *